(12) United States Patent
Im et al.

(10) Patent No.: US 7,660,614 B2
(45) Date of Patent: Feb. 9, 2010

(54) SLIDE TYPE PORTABLE TERMINAL

(75) Inventors: Sang-Hyuk Im, Gyeonggi-do (KR);
Hyun-Ho Lee, Gyeonggi-do (KR);
Chang-Il Lee, Gyeonggi-do (KR);
Kwon-Jin Kang, Gyeonggi-do (KR);
Red-Heat Oh, Seoul (KR); Ji-Sung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 17 days.

(21) Appl. No.: 11/944,363

(22) Filed: Nov. 21, 2007

(65) Prior Publication Data

US 2008/0117573 A1     May 22, 2008

Related U.S. Application Data

(63) Continuation of application No. 10/784,703, filed on Feb. 24, 2004, now Pat. No. 7,363,066.

(51) Int. Cl.
*G06F 1/16* (2006.01)
(52) U.S. Cl. .................................... 455/575.4
(58) Field of Classification Search ............. 455/556.1, 455/550.1, 575.4, 575.1; 361/680, 681
See application file for complete search history.

(56) References Cited

U.S. PATENT DOCUMENTS 7,076,058 B2 * 7/2006 Ikeuchi et al. .......... 379/433.12

2001/0009847 A1   7/2001  Kim et al.
2004/0198437 A1 * 10/2004 Yamamoto et al. ....... 455/556.1

FOREIGN PATENT DOCUMENTS

| CN | 1216658 | 5/1999 |
|----|---------|--------|
| CN | 1416256 | 5/2003 |
| CN | 1428989 | 7/2003 |
| GB | 2310562 | 8/1997 |

* cited by examiner

*Primary Examiner*—Nick Corsaro
*Assistant Examiner*—Michael T Vu
(74) *Attorney, Agent, or Firm*—Lee, Hong, Degerman, Kang & Waimey

(57) ABSTRACT

A slide type portable terminal can include a main unit including separated first and second key sections and a first plate coupled to a surface of the main unit and a display unit with a display screen on a front surface and a second plate. The second plate can slide with respect to the first plate and preferably slides along the surface of the main unit to cause the first and second key sections of the main unit to be covered and exposed by the display unit. Further, first and second magnets can be provided on the first and second plates, respectively, so that the same poles of the magnets face each other to provide a repulsive force when they are positioned to face close to each other. According to embodiments of the present invention, there are various advantages in that the portable terminal can be utilized more conveniently and production costs and failure rates thereof can also be reduced.

13 Claims, 7 Drawing Sheets

SLIDE TYPE PORTABLE TERMINAL

CROSS-REFERENCE TO RELATED APPLICATIONS

This application is a continuation of U.S. application Ser. No. 10/784,703, filed on Feb. 24, 2004, now U.S. Pat. No. 7,363,066, which pursuant to 35 U.S.C. § 119, claims the benefit of earlier filing date and right of priority to Korean application No. 2003-0047442, filed on Jul. 11, 2003, the contents of which are hereby incorporated by reference herein in their entirety.

BACKGROUND OF THE INVENTION

1. Field of the Invention

The present invention relates to a slide type portable terminal, and more particularly, to a slide type portable terminal in which a slide unit and a main unit can be slid against each other.

2. Background of the Related Art

As an example of a portable terminal, there are a mobile phone, PDA (personal digital assistant), a smart phone, and the like. Such a portable terminal can be classified into bar type, flip type, folder type and the like according to an external configuration thereof. Recently, a slide type portable terminal has come into the market. The configuration of a related art slide type portable terminal is illustrated in FIGS. 1 and 2.

As shown in FIGS. 1 and 2, the slide type portable terminal includes a flat, plate-shaped main unit 1 and slide unit 5 that are coupled to be slid in a longitudinal direction. A display screen 2 is provided on a front surface of the main unit 1. A variety of information is displayed on the display screen 2. A speaker 3 is also provided on an upper end of the front surface of the main unit 1 adjacent to the display screen 2. Further, a plurality of function buttons 4 are provided on a lower end of the front surface of the main unit 1.

The slide unit 5 can be slid against the main unit 1 to protrude beyond the main unit 1 at a predetermined distance and is provided with a plurality of number buttons 6 at a front surface thereof. The number buttons 6 are fully exposed to the outside when the slide unit 5 is slid against and protrudes beyond the main unit 1, and the number buttons 6 are covered by the main unit 1 when the slide unit 5 and the main unit 1 overlap each other. Further, a microphone 7 is provided on a lower end of the front surface of the slide unit 5.

FIG. 2 shows a structure for providing the sliding operation of the main unit 1 and slide unit 5 with respect to each other. As shown in FIG. 2, a main plate 10 and a slide plate 15 serve as the sliding structure. The main plate 10 is fixed to the main unit 1, and the slide plate 15 is fixed to the slide unit 5.

Guide channels 11 are formed on both lateral sides of the main plate 10 in a longitudinal direction. Further, fixing holes 12 are bored through lateral ends of the main plate 10. The fixing holes 12 are portions into which an end of a torsion spring 19 will be fixed.

The slide plate 15 is relatively shorter than the main plate 10. Further, guide ribs 16 are formed at both lateral ends thereof, respectively, such that the slide plate 15 can be guided and slid along the guide channels 11. Fixing holes 17 are also bored through a center of the slide plate 15.

The main plate 10 and the slide plate 15 are interconnected through the torsion spring 19. One end of the torsion spring 19 is fitted into the fixing hole 12 of the main plate 10 while the other end thereof is fitted into the fixing hole 17 of the slide plate 15. A pair of the torsion springs 19 are provided in a symmetric manner.

According to the related art slide type portable terminal, when the slide unit 5 is slid against the main unit 1, the slide plate 15 is slid along the main plate 10. At this time, the torsion spring 19 provides an elastic force such that the slide unit 5 can be kept in a state where it overlaps the main unit 1 (i.e., closed) and fully protrudes beyond the main unit 1 (i.e., open as shown in FIG. 1). In other words, if a user moves the slide unit 5 to a certain position with respect to the main unit 1, the slide unit 5 will be securely moved to a predetermined position by means of the elastic force of the torsion spring 19.

However, as described above, the related art slide type portable terminal has various disadvantages. First, owing to the elastic force of the torsion spring 19, the slide unit 5 can be kept either in the state where it overlaps the main unit 1 or in the state where it fully protrudes beyond the main unit 1. Therefore, there is a problem in that it is difficult to use the terminal in a variety of states. Further, the elastic force of the torsion spring 19 is used to set a stop position of the slide unit 5 against the main unit 1. In addition, since one end of the torsion spring 19 should be fixed to the main plate 10 and the other end thereof should also be fixed to the slide plate 15, its assembly works are difficult. Also, since the torsion spring is a mechanically connected structure, there is another problem in that mechanical troubles are likely to occur in use.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a portable terminal and method that can be used with only selected function keys exposed to the outside.

Another object of the present invention is to provide a slide type portable terminal and method that has increased reliability.

Another object of the present invention is to provide a slide type portable terminal and method having an interlinking mechanism capable of opening to selectively expose first and second pluralities of keys.

Another object of the present invention is to provide a slide type portable terminal and method having an interlinking mechanism that has a plurality of tensioned stop positions.

Another object of the present invention is to provide a slide type portable terminal and method having an interlinking mechanism is simplified and costs less to produce.

In order to achieve at least the above objects and advantages in a whole or in part, in accordance with one aspect of the present invention there is provided a slide type portable terminal that includes a main unit that includes separated first and second key sections exposed in a surface of the main unit and a display unit that includes a display screen exposed to a front surface of the display unit, wherein the display unit is configured to slide relative to the surface of the main unit to cause the first and second key sections of the main unit to be selectively exposed, wherein the display unit can be selectively slid to a first position where both the first and second key sections of the main unit are exposed, a second position where only one of the key sections is exposed, and a third position where both the first and second key sections are not exposed.

To further achieve at least the above objects in a whole or in part, in accordance with one aspect of the present invention there is provided a portable terminal that includes a main unit that includes first and second key sections separately accessible to a surface of the main unit and a display unit that includes a display screen, wherein the display unit is configured to selectively move relative to the surface of the main unit between a first position where both the first and second key sections of the main unit are not accessible, a second position where only one of the key sections is accessible, and a third position where both the first and second key sections are accessible.

To further achieve at least the above objects in a whole or in part, in accordance with one aspect of the present invention there is provided a slide type portable terminal that includes a main unit including separated first and second key sections and a first plate on a surface of the main unit, a display unit that includes a display screen on a front surface of the display unit and a second plate slidingly coupled to the first plate so that the first and second key sections of the main unit are selectively covered and exposed and first and second magnets on the first and second plates, respectively, so that the same poles of the magnets face each other to provide a repulsive force when they are positioned to face dose to each other.

To further achieve at least the above objects in a whole or in part, in accordance with one aspect of the present invention there is provided a method that includes sliding a display unit of a portable terminal to a first position where both first and second separated key sections of a main unit of the portable terminal are exposed in an upper surface of the main unit, sliding the display unit to a second position where only one of the key sections is exposed and sliding the display unit to a third position where both the first and second key sections are covered.

To further achieve at least the above objects in a whole or in part, in accordance with one aspect of the present invention there is provided a system including a slide type portable terminal with a first unit having first and second pluralities of keys and slidingly coupled to a second unit that includes a stopping mechanism coupled to the first and second units and configured to stop the first and second units in a first position where both the first and second key sections of the first unit are exposed, a second position where only one of the key sections is exposed, and a third position where both the first and second key sections are not exposed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
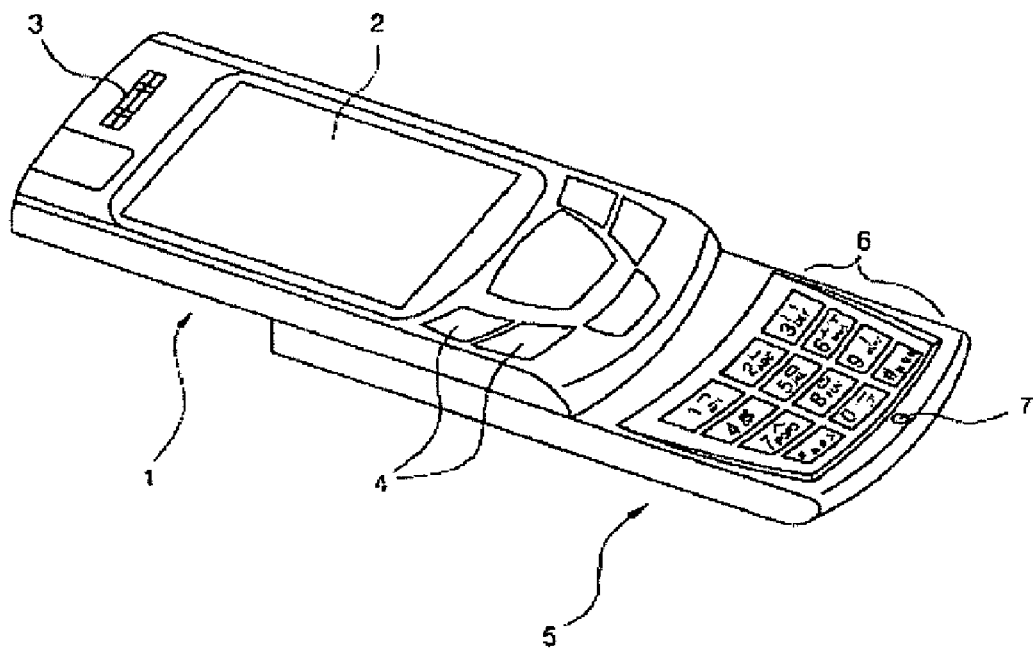
FIG. 1 is a diagram showing a perspective view of a configuration of a related art slide type portable terminal.
Figure 2:
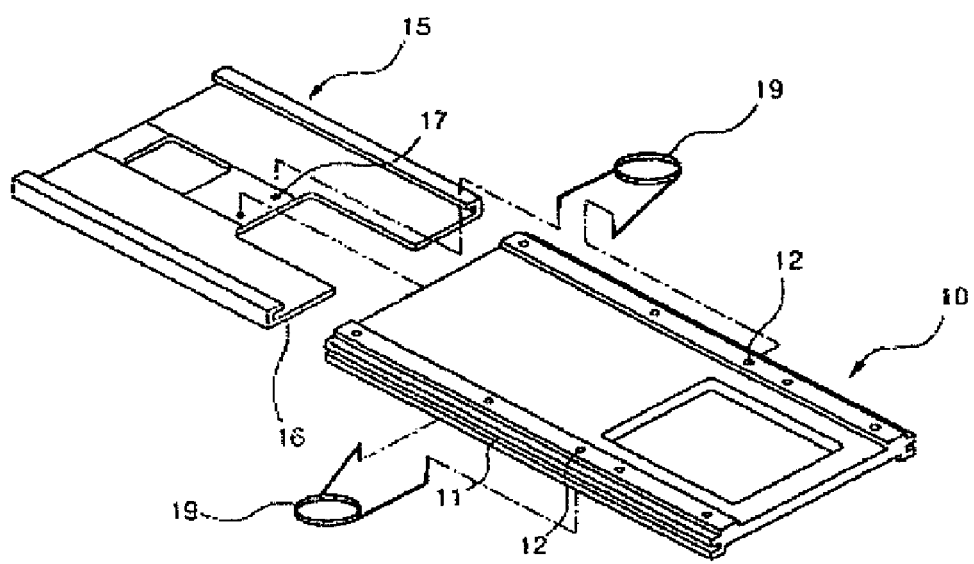
FIG. 2 is a diagram showing an exploded perspective view of a structure of main portions of the related art slide type portable terminal.
Figure 3:
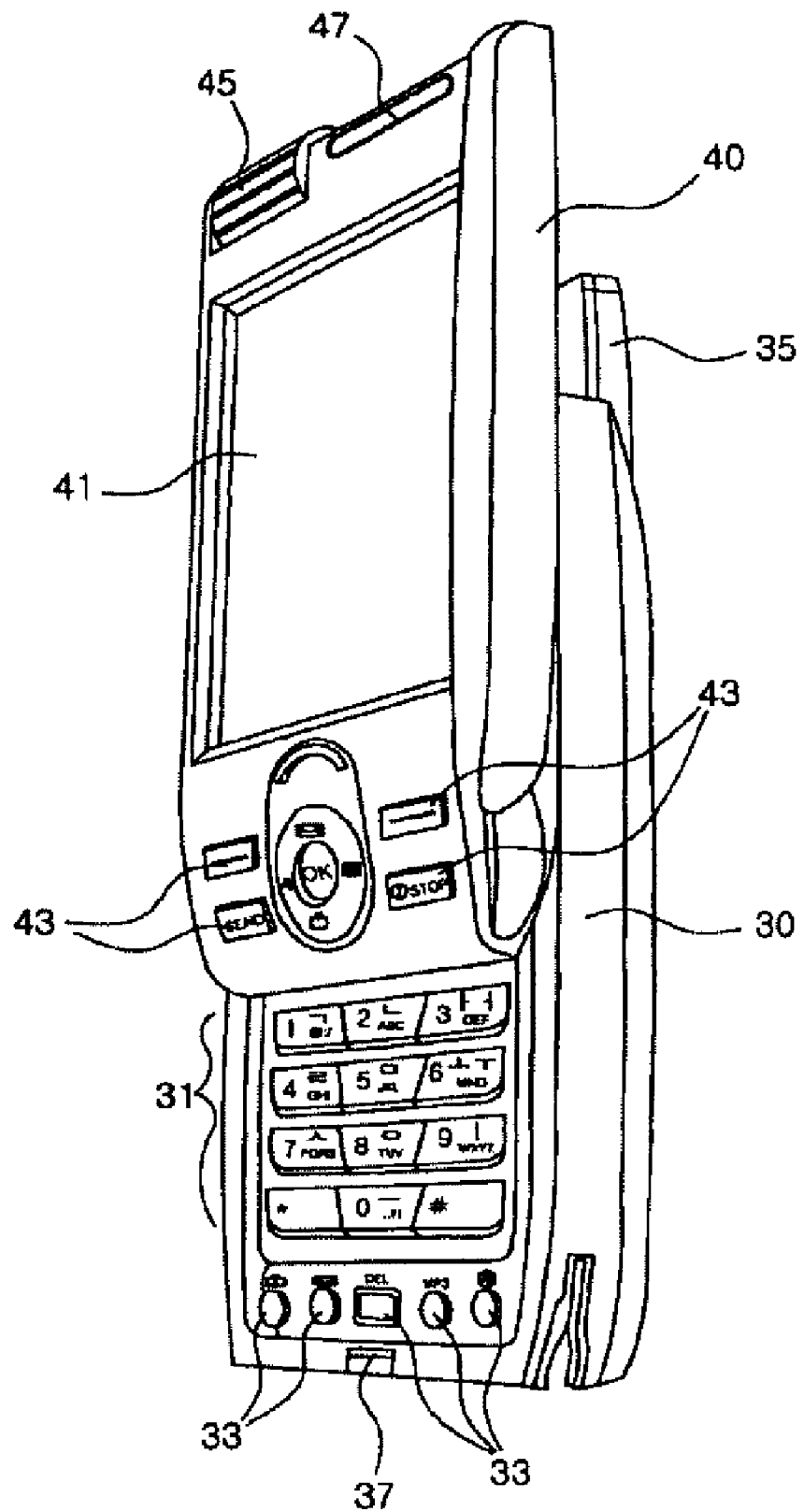
FIG. 3 is a diagram showing a perspective view of a preferred embodiment of a slide type portable terminal according to the present invention.
Figure 4:
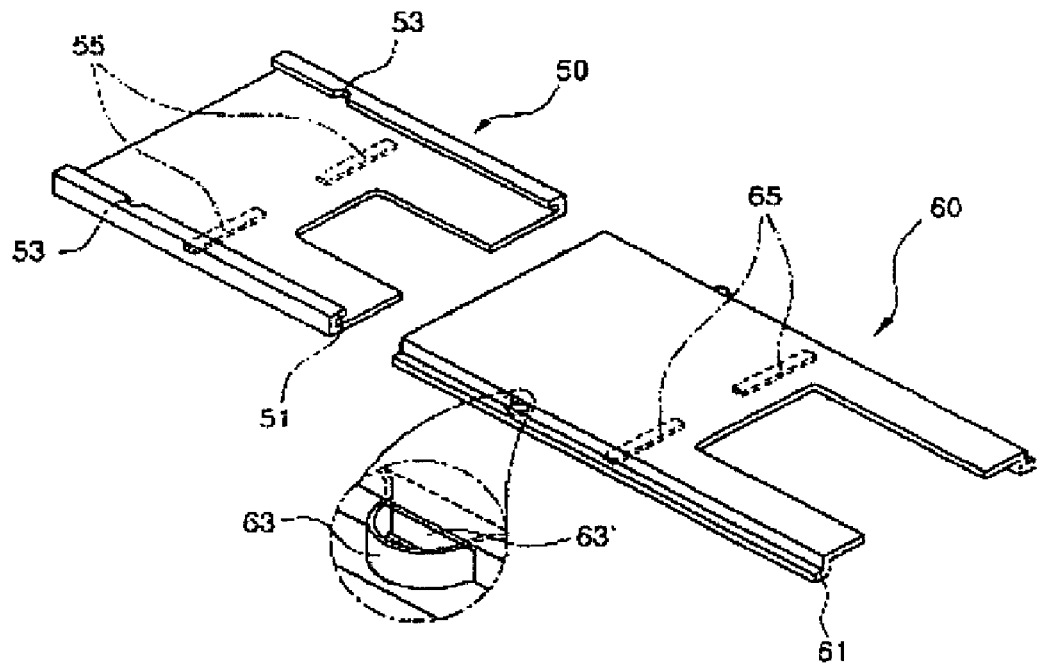
FIG. 4 is a diagram showing an exploded perspective view of a structure of first and second plates according to a preferred embodiment of the present invention.
Figure 5:
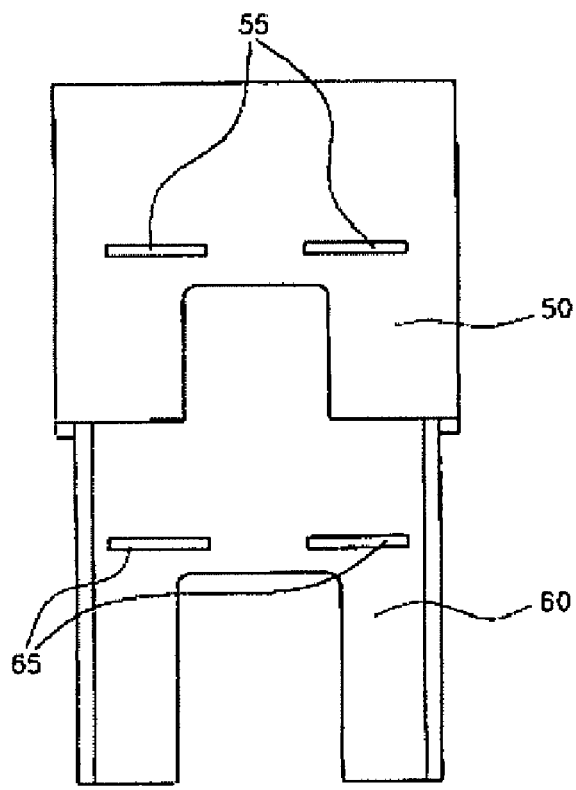
FIG. 5 is a diagram showing a rear view where the first and second plates being coupled with each other according to a preferred embodiment of the present invention.

FIG. 3 is a perspective view of slide type portable terminal according to an embodiment of the present invention. FIG. 4 is an exploded perspective view showing structure of exemplary first and second plates of FIG. 3. FIG. 5 is a rear view showing a state where the first and second plates are coupled with each other.

As shown in FIGS. 3-5, a main unit 30 can take the shape of a generally thin hexahedron and be provided with a plurality of number keys 31 at a (e.g., front) surface thereof. The number keys 31 can have a function of inputting numbers, characters and the like. The number keys 31 can be arranged in the form of a 4 by 3 matrix. However, the present invention is not intended to be so limited. For example, a different total number or different arrangements of the keys 31 can be used.

Multimedia keys 33 (e.g., first function keys) can also be provided at a prescribed location below the number keys 31, on the main unit 30 (e.g., at a lower end of a front surface of the main unit 30.) The multimedia keys 33 are preferably used to perform a multimedia function inherent to the terminal. For example, they may be a key for operating a camera 45, a key for playing the MP3, or the like. As shown in FIG. 3, these multimedia keys 33 are preferably provided in a row at the lower end of the front surface of the main unit 30.

An antenna 35 can be provided at one side of an upper end of the main unit 30. The antenna 35 is required for external communications. A microphone 37 can also be provided at a lowermost end of the front surface of the main unit 30. The microphone 37 preferably functions as a telephone transmitter when the terminal is used as a telephone.

Further, a display unit 40 is preferably provided on the front surface of the main unit 30. The display unit can also take the shape of a generally thin hexahedron, and a display screen 41 is provided on a surface (e.g., front) of the display unit. As the display screen 41, a liquid crystal panel is commonly used but a liquid crystal panel having a touch screen function may also be used. Of course, other various display units may be used for the display screen 41.

A plurality of function keys 43 (e.g., second function keys) can be provided at a lower end of the front surface of the display unit 40. The function keys 43 can allow the function of the terminal to be immediately or continuously performed. For example, the function keys can include a key used to execute a program for sending and receiving an electronic mail, a key used to perform a telephone function when receiving a phone call, a key used to select contents displayed on the display screen 41, and the like.

The camera 45 can be provided at a prescribed location such as at one side on the upper end of the front surface of the display unit 40. The camera 45 is preferably rotatably mounted to the display unit 40 such that a camera angle can be changed without moving the camera itself. A speaker 47 can also be located on the upper end of the display unit and can correspond to a telephone receiver when the portable terminal is performing the telephone function.

The main unit 30 and the display unit 40 can slide against each other in a longitudinal direction thereof so that the number keys 31 and the multimedia keys 33 can be exposed or selectively covered by the display unit 40. To allow the main unit 30 and the display unit 40 to be slid against each other as described above, an additional structure for guiding the sliding operation of the main unit 30 and display unit 40 can be provided on the units themselves.

As shown in FIGS. 4 and 5, an example of the structure, which is installed on the main unit 30 and display unit 40 so as to guide the sliding operation thereof, win now be described. A first plate 50 can be provided on the main unit 30, for example, on the front surface at a position above the number keys 31. Sliding guides 51 that allow the first plate 50 to be slid with respect to a second plate 60 can be provided at both lateral ends of the first plate 50.

Stopper grooves 53 can be provided at a longitudinal side of the first plate 50. In the illustrated embodiment of the present invention, the stopper grooves 53 are formed at both lateral ends of the first plate 50 to face each other. Further, first magnets 55 can be provided about in the middle of the first plate 50 in a longitudinal direction thereof. Although the two first magnets 55 have been employed in the illustrated embodiment of the present invention, the present invention is not intended to be so limited because, for example, more magnets can be used. Alternatively, the magnets 55 may be installed across the first plate 50.

The second plate 60 can be installed on the display unit 40, for example, on a rear surface thereof. The second plate 60 is slid with respect to the first plate 50. Sliding guides 61 that correspond to the sliding guides 51 of the first plate 50 can also be provided at both lateral ends of the second plate 60. As shown in FIGS. 4-5, the exemplary sliding guides 51 and 61 are in the forms of guide channels and guide ribs, respectively, but the present invention is not intended to be necessarily limited thereto. Alternatively, any other guide structures for allowing the first and second plates 50 and 60 to be slid against each other may be used or added. Further, the recessed and protruding sliding guides (e.g., 51 and 61 can be respectively attached to either the main unit 30 or the display unit 40.

Stopper springs 63 can be provided on the second plate 60 to correspond to the stopper grooves 53 of the first plate 50. As shown in the expanded view in FIG. 4, the stopper springs 63 are preferably formed by causing a middle portion of a metal band to be bent and protrude outwardly. Front ends of the stopper springs 63 protrude outwardly through holes 63' that are corresponding formed on both lateral sides of the second plate 60. The outwardly protruding front ends of the stopper springs 63 can be securely but not fixedly seated into the stopper grooves 53 so that the sliding operation between the first and second plates 50 and 60 is stopped or resisted. Rear ends of the stopper springs 63 can be held (e.g., using screws) on one side of the second plate 60 such that the springs can provide an elastic force.

Second magnets 65 can be provided on the second plate 60. It is preferred that the second magnets 65 be provided equal in number to the first magnets 55. The first and second magnets 55 and 65 preferably have a prescribed arrangement so that the same poles of the magnets face each other to provide a repulsive force when they are positioned close to each other. Further, if the first and second magnets 55 and 65 are placed on the opposite positions of the first and second plates 50 and 60, their repulsive force can be increased or maximally provided. However, a larger gap can be required between the first and second plates 50 and 60 because of their thickness. To this end, the magnets 55 and 65 may be placed into grooves, recesses or holes that are formed on the opposite positions of the plates 50 and 60.

Operations of the slide type portable terminal according to an embodiment so constructed will now be described. The slide type portable terminal of FIG. 3 preferably has more than one stop position when the display unit 40 is slid with respect to the main unit 30. That is, when the display unit 40 is slid with respect to the main unit 30, the display unit 40 is preferably first stopped at a position where only the multimedia keys 33 on the main unit 30 are exposed to the outside. Such a state is shown in FIGS. 7A and 7B.

Figure 6A:
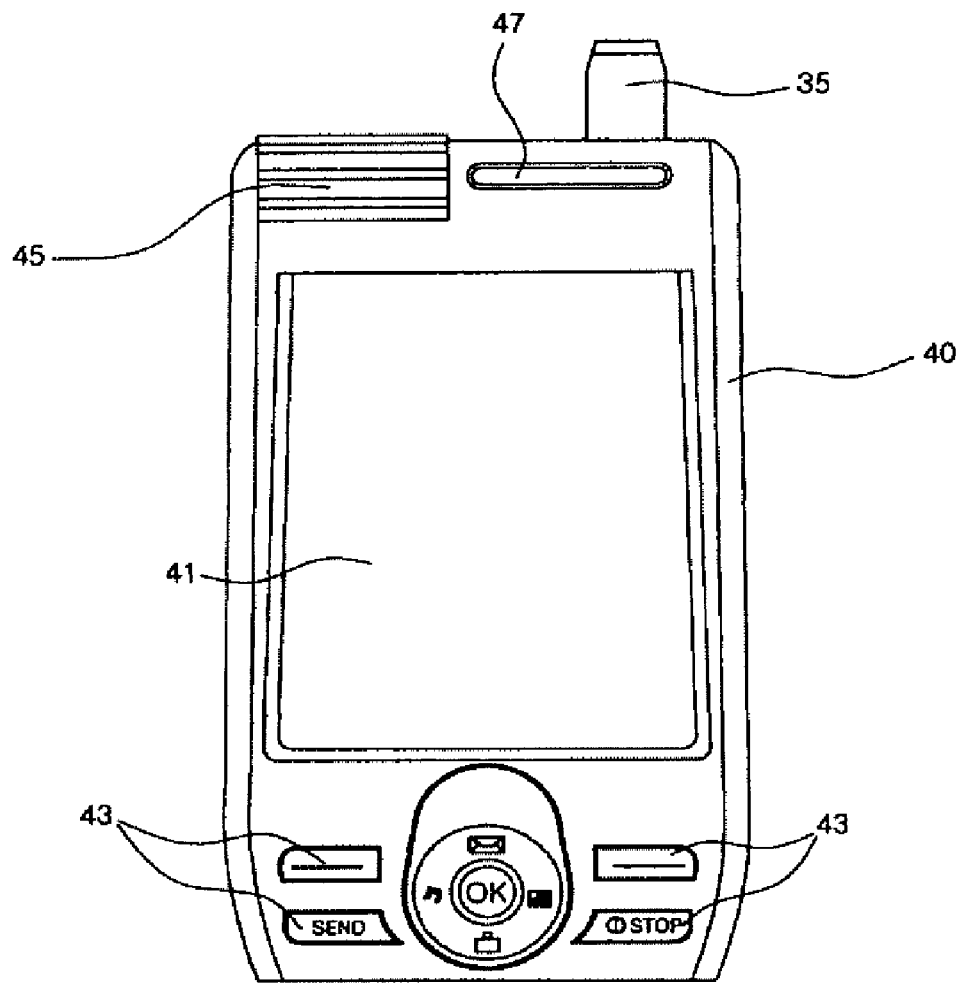
FIGS. 6A and 6B are diagrams that show a dosed state of a preferred embodiment of a slide type portable terminal.
Figure 6B:
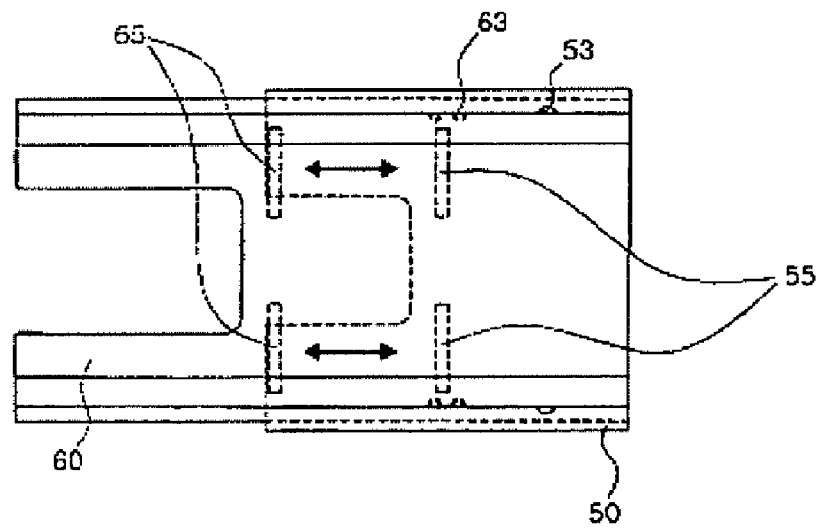
Figure 7A:
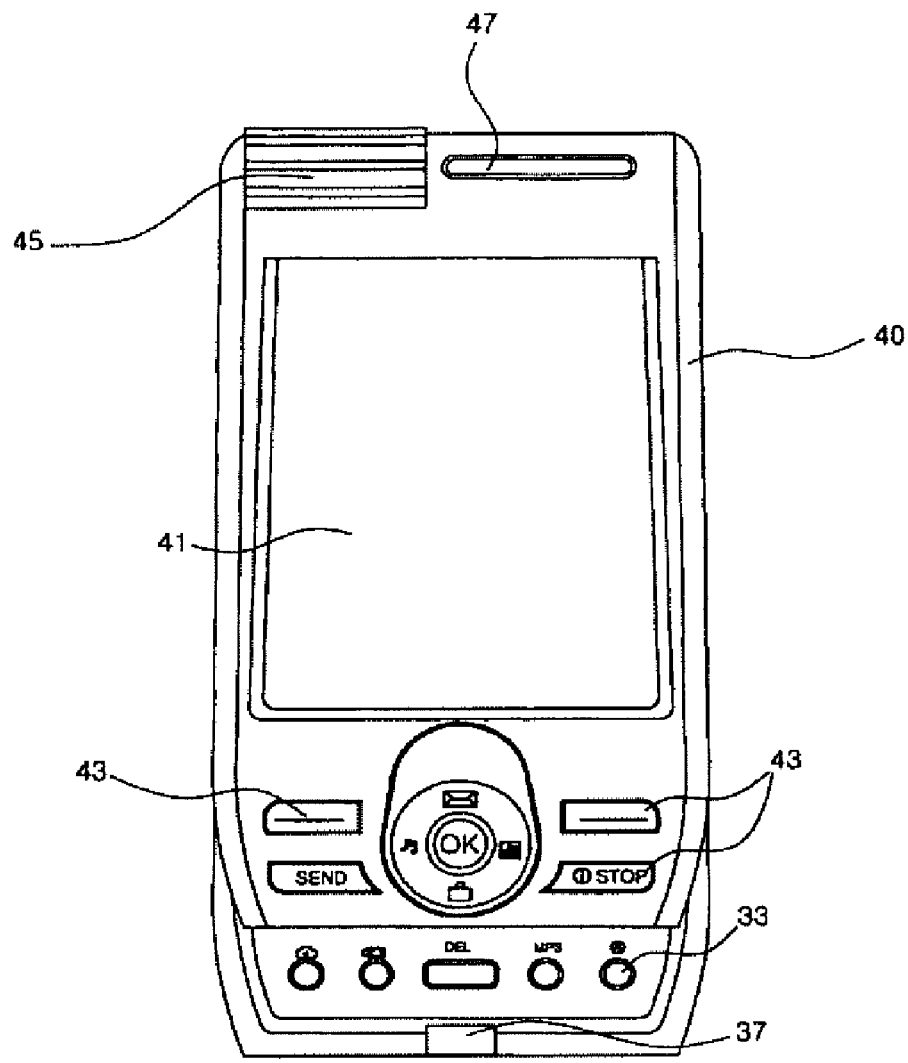
FIGS. 7A and 7B are diagrams that show a partially opened state of a preferred embodiment of a slide type portable terminal.
Figure 7B:
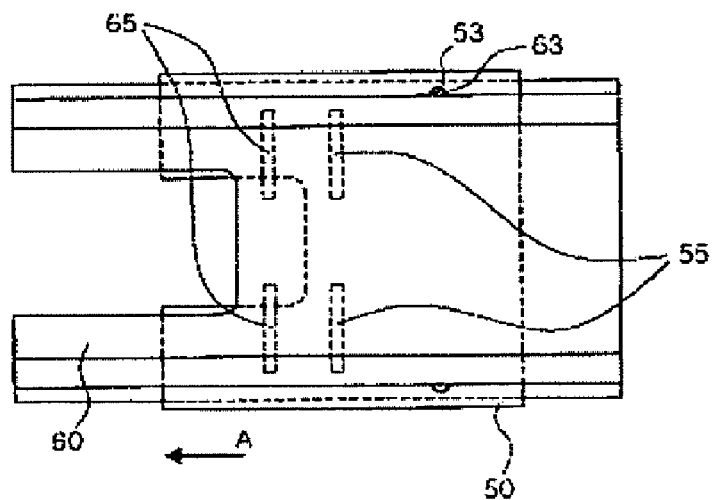

The state shown in FIGS. 7A and 7B can be obtained because the front end of the stopper spring 63 is securely seated into the relevant stopper groove 53. That is, if a user pushes up the display unit 40 against the front surface of the main unit 30 in a state of FIGS. 6A and 6B, the second plate 60 is slid against the first plate 50 until the stopper spring 63 of the second plate 60 can be securely seated into the stopper groove 53, whereby the sliding operation will be stopped. Therefore, the user can use the multimedia keys 33 in a state shown in FIG. 7A.

If the user applies a force sufficient to overcome the elastic force of the stopper spring 63 to the display unit 40, the stopper spring 63 is not seated into but passes over the stopper groove 53. Therefore, a state shown in FIGS. 8A and 8B can be directly obtained.

However, if a user wishes to use the number keys 31 while using the multimedia keys 33 in the state where the stopper spring 63 is securely seated into the stopper groove 53, the following steps can be performed. That is, if the user applies a predetermined force to the display unit 40, the stopper spring 63 can be elastically deformed by the sliding guide 51 and then retracted into the holes 63'. Thus, the display unit 40 can slide from the position shown in FIG. 7A against the main unit 30 (e.g., to the position of FIG. 7A or FIG. 8A).

In addition, if the display unit 40 is further slid against the main unit 30, the magnets 55 and 65 can be placed on a position where they face each other. In such a position, the magnets 55 and 65 can provide a repulsive force. At this time, the display unit 40 will slide or be urged with respect to the main unit 30 by means of the resultant force of the repulsive force between the magnets 55 and 65 and/or a pushing force applied by the user, in a direction in which the user applies the pushing force to the display unit 40.

Figure 8A:
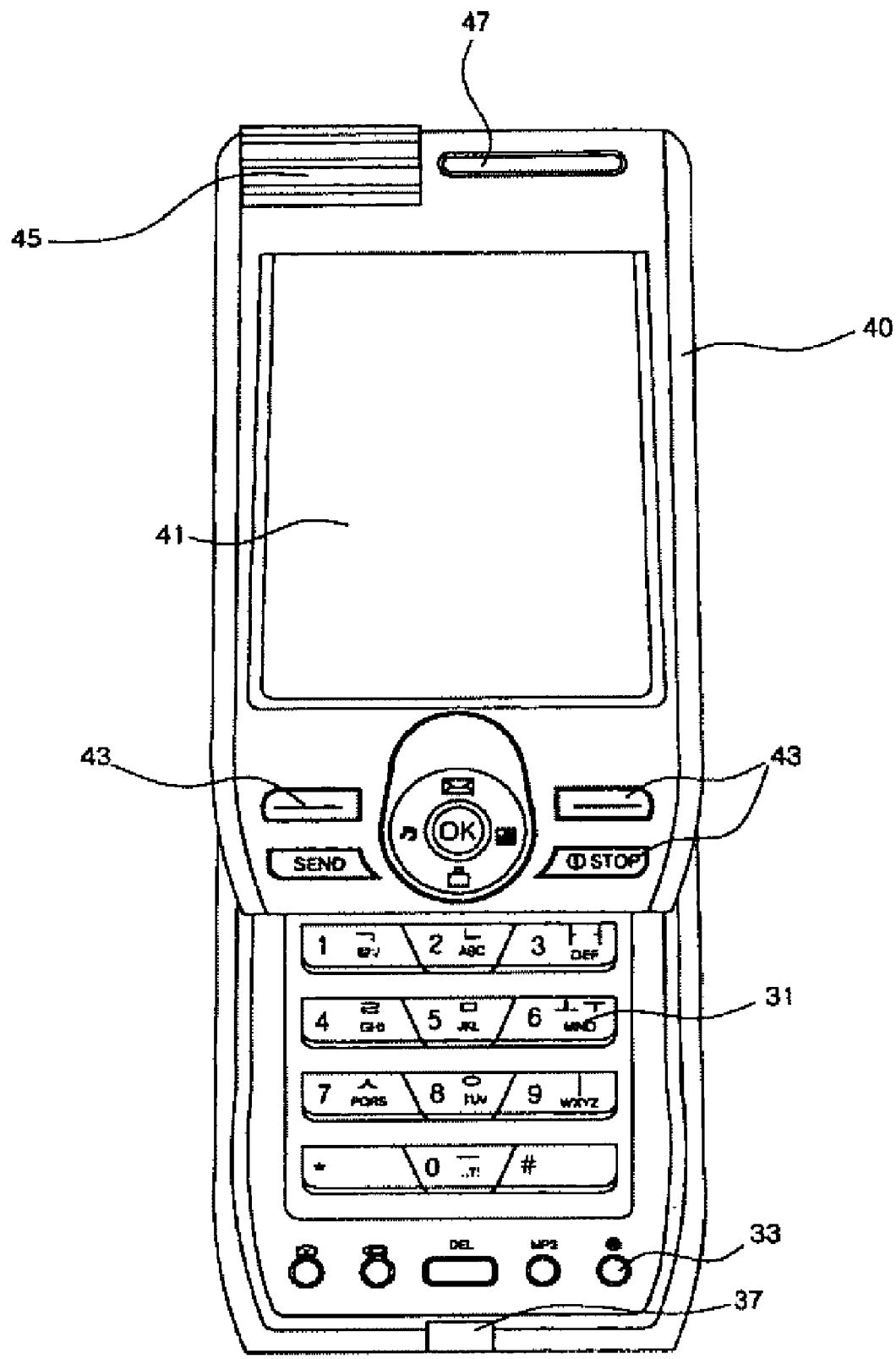
FIGS. 8A and 8B are diagrams that show a completely opened state of a preferred embodiment of a slide type portable terminal.
Figure 8B:
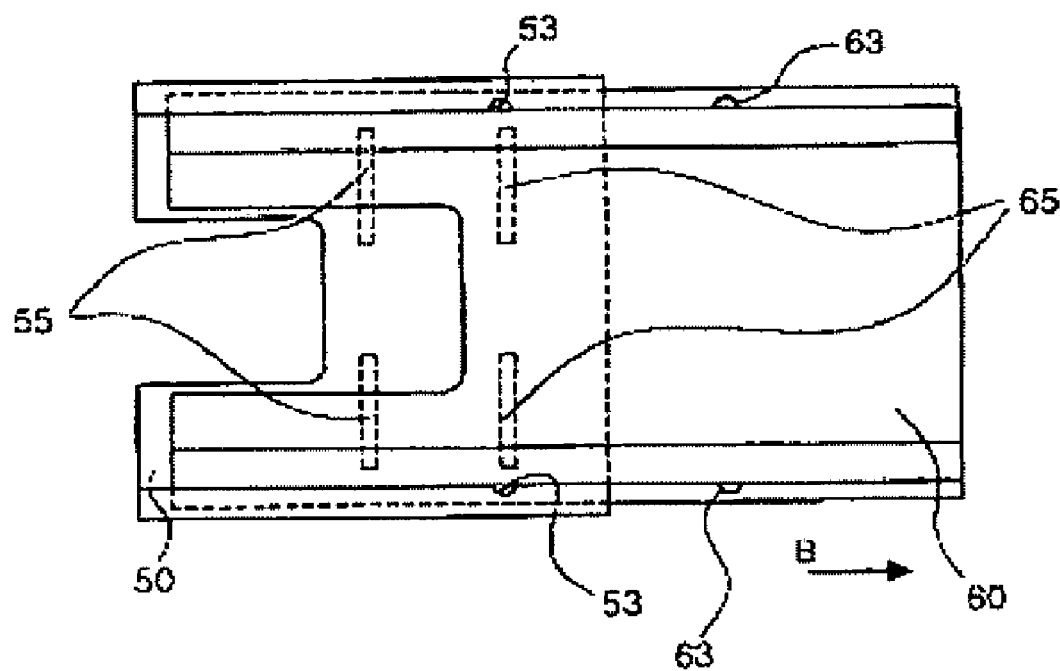

For example, if the user applies a pushing force to the display unit 40 in a direction of an arrow A in a state shown in FIG. 7B, the first plate 50 is slid against the second plate 60 such that the state shown in FIGS. 8A and 8B can be obtained. In the state of FIG. 8, the number keys 31 are fully exposed so that the user can use the number keys 31. Here, an additional stopper mechanism can be used or required to allow the display unit 40 or the second plate 60 to stop against the main unit 30 or the first plate 50 at the state shown in FIGS. 8A and 8B. The additional mechanism may be provided, for example, at specific corresponding positions of the units 30 and 40, the plates 50 and 60, or the pair of sliding guides.

Alternatively, if the user applies a pushing force to the display unit 40 in a direction of an arrow B shown in FIG. 8B, the first plate 50 is slid against the second plate 60 and the user can allow the display unit 40 and the main unit 30 to overlap each other, (e.g., obtain the state shown in FIG. 6A. Then, the second magnet 65 of the second plate 60 is gradually approached to the first magnet 55 of the first plate 50, and finally, the state where they face each other is obtained. In such a state, if an additional force is applied to the display unit 40 by the user, the display unit 40 is continuously moved by the resultant force of the pushing force applied by the user and the repulsive force between the magnets 55 and 65.

At this time, if the force applied to the display unit 40 is a force sufficient to overcome the elastic force of the stopper spring 63 and thus to pass over the stopper groove 53, the display unit 40 can go directly into the state shown in FIGS. 6A and 6B without undergoing the state shown in FIG. 7A (e.g., a state where the stopper spring 63 is securely seated into the intermediate stopper groove 53).

For reference, the position where the magnets 55 and 65 directly face each other may vary according to slide type portable terminal or the design conditions thereof. For example, it can be designed such that the magnets 55 and 65 directly face each other at an intermediate position between a position where the display unit 40 moves highest (e.g., FIG. 8A) and a position where the stopper spring 63 is securely seated into the stopper groove 53 (e.g., FIG. 7A). In such a case, the repulsive force between the magnets 55 and 65 is used to allow the display unit 40 to be slid to the two positions.

Alternatively, it can be designed such that the magnets 55 and 65 directly face each other at an intermediate position between a position where the display unit 40 moves highest and a position where the display unit 40 and the main unit 30 overlap each other. In such a case, the repulsive force between the magnets 55 and 65 can be used to allow the display unit 40 to slide into the position where the display unit 40 moves highest and the state where the display unit 40 and the main unit 30 overlap each other to the two positions. At this time, the elastic force of the stopper spring 63 should be greater than the repulsive force between the magnets 55 and 65.

As described above, according to embodiments of the present invention, a slide type portable terminal can be a mobile phone. However, the present invention is not intended to be so limited. For example, a portable terminal can include a PDA, a smart phone or the like.

As described above, for example, the sliding operation of the display unit can be performed in two steps by the stopper mechanism, so that the slide type portable terminal can be used either in a state where only the multimedia keys are exposed or in a state where the number keys as well as the multimedia keys are exposed. However, the present invention is not intended to be so limited. For example, embodiments according to the present invention may be configured in such a manner that the main unit and the display unit are slid against each other without using the first and second plates. The structure or mechanism for performing the sliding operation between the first and second plates can be implemented in various manners other than that illustrated in the accompanying drawings. Further, additional steps in the sliding operation may be desired.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of a slide type portable terminal and methods of using the same have various advantages. According to embodiments of a slide type portable terminal of the present invention, the display unit can be slid in two steps when it is slid with respect to the main unit. As a result, the main unit can be exposed in whole or in part, if necessary, so that a desired operation can be performed. Therefore, there is an advantage in that the user can use the slide type portable terminal in various manners and thus the convenience of user can also be enhanced.

In addition, the display unit can be slid against the main unit by using the magnetic force of the magnets instead of mechanically interlocking parts. Therefore, there is another advantage in that the production costs and failure rate can be reduced because of a decrease in the number of parts of the slide type portable terminal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A slide type portable terminal, comprising:
   a main unit that includes separated first and second key sections exposed on a surface of the main unit, wherein the first key section performs a first functionality and the second key section performs a second functionality;
   a display unit that includes a display screen exposed to a front surface of the display unit,
   wherein the display unit is configured to slide relative to the main unit to cause the first and second key sections of the main unit to be selectively exposed, wherein the display unit further comprises at least one function key to selectively activate different terminal functions,
   wherein the display unit selectively slides to a first position where the first key section is exposed, a second position where the second key section is exposed, and a third position where both the first and second key sections are inaccessible; and
   a stopper mechanism comprising a stopper spring and a groove, wherein first and second ends of the stopper spring are fixed, and wherein the stopper spring is configured to engage the groove to stop and maintain the second position.

2. The slide type portable terminal of claim 1, wherein the second key section comprises keys for performing multimedia functions.

3. The slide type portable terminal of claim 1, wherein the first key section is a number key section.

4. The slide type portable terminal of claim 1, wherein first and second magnets are correspondingly arranged on the main unit and the display unit, respectively, so that the same poles of the magnets face each other to provide a repulsive force when the magnets are positioned to face close to each other.

5. The slide type portable terminal of claim 4, wherein corresponding sliding structures configured to perform sliding operations of the main unit and the display unit are provided on opposite lateral ends of the main unit and the display unit.

6. A slide type portable terminal, comprising:
a first unit that includes separated first and second key sections exposed on a surface of the first unit;
a second unit slidably coupled to the first unit, the second unit having a display screen exposed on a surface of the second unit and a third key section exposed on the surface of the second unit,
wherein the second unit is configured to slide relative to the first unit to cause the first and second key sections of the first unit to be selectively exposed,
wherein the second unit selectively slides to a first position where the first key section is exposed, a second position where the second key section is exposed, and a third position where both the first and second key sections are not exposed; and
a stopper mechanism comprising:
a stopper spring disposed on at least one of the surface of the first unit and the surface of the second unit, wherein first and second ends of the stopper spring are fixed; and
a stopper groove disposed on at least one of the surface of the first unit and the surface of the second unit,
wherein the stopper spring is configured to engage the stopper groove when the second unit is in at least one of the first position and second position, and wherein the stopper spring applies an elastic force against the stopper groove.

7. The slide type portable terminal of claim 6, wherein the second key section comprises keys for performing multimedia functions.

8. The slide type portable terminal of claim 6, wherein the first key section is a number key section.

9. The slide type portable terminal of claim 6, wherein first and second magnets are correspondingly arranged on the first unit and the second unit, respectively, so that the same poles of the magnets face each other to provide a repulsive force when the magnets are positioned to face close to each other.

10. The slide type portable terminal of claim 9, wherein corresponding sliding structures configured to perform sliding operations of the first unit and the second unit are provided on opposite lateral ends of the first unit and the second unit.

11. A slide type portable terminal, comprising:
a main unit that includes separately accessible first and second key sections exposed on a surface of the first unit;
a display unit that includes a display screen,
wherein the display unit is configured to slide relative to the main unit to cause the first and second key sections of the main unit to be selectively accessible,
wherein the display unit selectively slides to a first position where the first and second key sections are inaccessible, a second position where the first key section is accessible, and a third position where the second key section is accessible,
wherein the first key section is operated to perform a function of inputting numbers, and the second key section is operated to perform a function of playing music; and
a stopper mechanism comprising a stopper spring and a groove, wherein first and second ends of the stopper spring are fixed, and wherein the stopper spring is configured to engage the groove to stop and maintain the second position.

12. The slide type portable terminal of claim 11, wherein first and second magnets are correspondingly arranged on the main unit and the display unit, respectively, so that the same poles of the magnets face each other to provide a repulsive force when the magnets are positioned to face close to each other.

13. The slide type portable terminal of claim 12, wherein corresponding sliding structures configured to perform sliding operations of the main unit and the display unit are provided on opposite lateral ends of the main unit and the display unit.

* * * * *